United States Patent [19]

Tabata

[11] Patent Number: 4,645,349
[45] Date of Patent: Feb. 24, 1987

[54] METHOD OF MEASURING FILM THICKNESS

[75] Inventor: Hidetoshi Tabata, Kawasaki, Japan

[73] Assignee: O R C Manufacturing Co., Ltd., Chofu, Japan

[21] Appl. No.: 732,709

[22] Filed: May 10, 1985

[30] Foreign Application Priority Data

Sep. 21, 1984 [JP] Japan .................................. 59-198149

[51] Int. Cl.$^4$ ............................................. G01B 11/06
[52] U.S. Cl. .................................... 356/382; 356/355
[58] Field of Search ................................ 356/382, 355

[56] References Cited

U.S. PATENT DOCUMENTS 3,238,839  3/1966  Day, Jr. ................................ 356/355
4,408,884 10/1983  Kleinknecht et al. ............... 356/355

OTHER PUBLICATIONS

"Thickness and Refractive Index Measurement of a Lamina with a Michelson Interferometer" Jeppesen et al., *Journal of the Optical Society America* vol. 56 #4, Apr. 1966.

*Primary Examiner*—R. A. Rosenberger
*Assistant Examiner*—Crystal D. Cooper

*Attorney, Agent, or Firm*—Cushman, Darby & Cushman

[57] ABSTRACT

An improved method of measuring film thickness of the film layer on a certain material is disclosed. The method is carried out by way of the steps of measuring reflection intensity spectrum, determining extreme values of wavelength relative to the spectrum, preparing an expected value table relative to the reflection interference orders associated with the extreme values of wavelength, calculating a group of expected values of film thickness with reference to the expected value table, calculating deviated values among the values of film thickness in association with the group of expected values, determining the expected orders which minimize absolute values corresponding to deviated values as true interference orders and determining a required film thickness with reference to the thus determined interference orders. To display wavelength scanned by a monochromator and intensity of reflected light beam transmitted from the material to be measured, an oscilloscope or a CRT is used in operative association with the monochromator. The monochromator is equipped with a diffraction grating which serves to generate marker signals having a predetermined step wavelength.

4 Claims, 4 Drawing Figures

METHOD OF MEASURING FILM THICKNESS

BACKGROUND OF THE INVENTION

1. Field of the Invention

The present invention relates to a method of measuring film thickness of the film layer and more particularly to a method of measuring thickness of various kind of film on a certain material by measuring spectral reflectivity.

2. Description of the Prior Art

When light beam is emitted to material of which film thickness is to be measured, reflection interference takes place between light beam reflected at the surface of the film layer and light beam reflected at the interface between the film layer and the base plate and thus reflected light beam reaches the extreme value of intensity when it has a certain specific wavelength. At this moment the operating condition is generally represented by the following formula.

$$2nd = m\lambda \quad (1)$$

where the above operating condition represents the case when intensity of reflected light beam assumes the maximum value.

$$2nd = (m + 1/8)\lambda \quad (2)$$

where the above operating condition represents the case when intensity of reflected light beam assumes the minimum value.

In the above-noted formulas reference letter n designates refractive index, reference letter d designates the film thickness, reference letter m designates the order of interference and reference letter $\lambda$ designates the wavelength of the light beam.

Now, it is assumed that in the formula (1) the orders corresponding to extreme values (either maximum or minimum one) are represented by $m_1$ and $m_2$ and wavelength associated with the orders are represented by $\lambda_1$ and $\lambda_2$ (where $\lambda_2 < \lambda_1$). Thus, the formula (1) is modified into the following two formulas.

$$2nd = m_1 \lambda_1 \quad (3)$$

$$2nd = m_2 \lambda_2 \quad (4)$$

Incidentally, the film layer concerned with the invention is a film layer on the base plate such as silicon wafer or the like on which light beam is scattered and absorbed very few. When the orders $m_1$ and $m_2$ and wavelength $\lambda_1$ and $\lambda_2$ are determined, it results that film thickness d can be determined. On the other hand, the following formula is obtained from the formulas (3) and (4).

$$d = \frac{(m_2 - m_1)}{2n} \frac{\lambda_1 \lambda_2}{\lambda_1 - \lambda_2} \quad (5)$$

Since the following relation is existent between the adjacent maximum values (peaks) of intensity of reflected light or between the adjacent minimum values (dips) in the formula (5), namely $$m_2 - m_1 = 1$$

the following formula (6) is obtained.

$$d = \frac{1}{2n} \frac{\lambda_1 \lambda_2}{\lambda_1 - \lambda_2} \quad (6)$$

When film thickness is measured by utilizing the formula (6), there is no necessity for obtaining absolute value of the orders $m_1$ and $m_2$. In this case, however, measuring of film thickness can be easily achieved by scanning wavelength of monochromatic light and thereby measuring intensity spectrum of reflected light.

However, it is found that the conventional method of measuring film thickness by using the formula (6) has a problem that film thickness d is measured with lower accuracy because of the fact that the formula (6) contains two values of $\lambda_1$ and $\lambda_2$ with measuring error unavoidably included therein.

SUMMARY OF THE INVENTION

Thus, the present invention has been made with the foregoing problem in mind and therefore its object resides in providing an improved method of measuring film thickness with higher accuracy.

To accomplish the above object there is proposed according to the present invention a method of measuring film thickness of the film layer on a certain material of which film thickness is to be measured, essentially comprises the steps of measuring reflection intensity spectrum, determining extreme values of wavelength relative to the spectrum, preparing an expected value table relative to the reflection interference orders associated with the extreme values of wavelength, calculating a group of expected values of film thickness with reference to the expected value table, calculating deviated values among the values of film thickness in association with the group of expected values, determining the expected number of orders which minimizes absolute values corresponding to the deviated values as true interference orders and determining a required film thickness with reference to the thus determined interference orders.

Preferably, the method of the invention is carried out by operating an apparatus which essentially comprises light source, a monochromator, a semi-transparent mirror, a reflection mirror, an observation mirror, an objective lens, a photomultiplier tube adapted to receive reflected light from the material to generate photoelectric current, an amplifier and an oscilloscope or CRT.

The monochromator is usually equipped with a diffraction grating which serves to generate a series of marker signals having a predetermined step wavelength.

To visually observe wavelength scanned by the monochromator and intensity of reflected light beam an oscilloscope is usually employed as display means.

Other objects, features and advantages of the present invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail hereunder with reference to the accompanying drawings which illustrate a preferred embodiment thereof.

Figure 2:
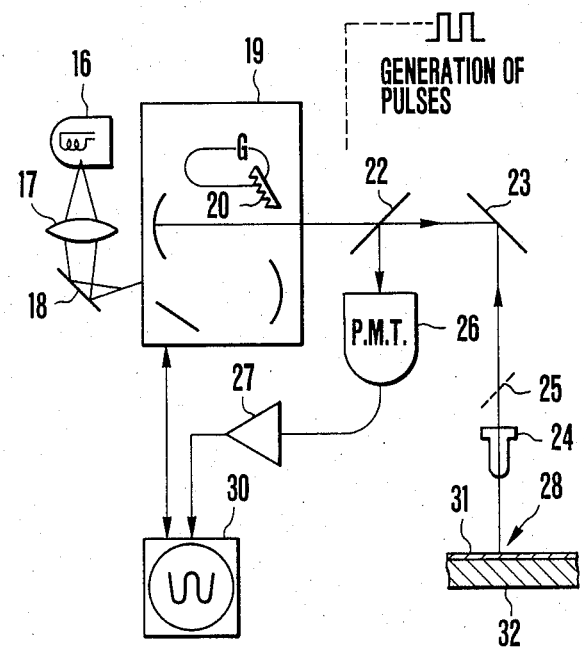
FIG. 2 is a schematic view illustrating the structure of an apparatus which can be preferably employed for carrying out the method of the invention.

To facilitate understanding of the present invention a film thickness measuring apparatus preferably employable for carrying out the method of the invention will be described below with reference to FIG. 2 which schematically illustrates a typical example of the apparatus. In the drawing reference numeral 16 designates light source which is adapted to emit light beam toward the surface of a film layer on a material 28 of which film thickness is to be measured. White light emitted from the light source 16 is introduced into a monochromator 19 via a light collecting lens 17 and a reflective mirror 18.

Figure 3:
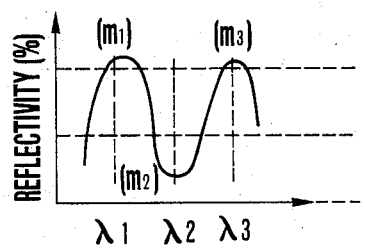
FIG. 3 is a graph illustrating a typical example of reflection intensity spectrum.

The monochromator 19 is preferably provided with a diffraction grating 20. By rotating the diffraction grating 20 in such a manner as to vary angle of thus introduced light beam and diffracted one it is possible to scan the wavelength of monochromatic light. As the diffraction grating 20 is rotated by means of a stepping motor which is disposed outside the apparatus, a series of marker signals are generated which have a predetermined step wavelength. The arrangement of the apparatus made in that way makes it possible to effectively process data relative to the thus generated marker signals. Light beam which has been spectrally transformed into monochromatic light in the monochromator 19 is then emitted toward the material 28 via semi-transparent mirror 22, reflective mirror 23, observation mirror 25 and objective lens 24. It should be noted that the present invention should not be limited only to monochromatic light. Alternatively, ultraviolet ray, visual ray and infrared ray may be employed for carrying out the method of the invention. As is apparent from the drawing, the material 28 to be measured is constituted by a combination of base plate 32 made of silicon or the like material and layer of transparent thin film 31 lined over the former whereby a layered structure is produced. After monochromatic light reaches the material 28, a part of thus introduced light is reflected at the surface of the film layer 31 and another part of the same is reflected at the interface existent between the film layer 31 and the base plate 32 whereby reflective interference takes place therebetween. After completion of reflective interference reflected light beam is reflected at the mirror 23 and it is then reflected again at the semi-transparent mirror 22 so that it is inputted into a photo-multiplier tube (hereinafter referred to as P.M.T.) 26 which is adapted to generate photoelectric current in proportion to the intensity of incident light. Photoelectric current outputted from P.M.T. 26 is amplified by means of an amplifier 27 and thereafter it is transmitted to an oscilloscope or the like instrument 30 (hereinafter referred to as CRT). CRT 30 serves to display wavelength scanned in the monochromator 19 and intensity of reflected light in the form of output as illustrated in FIG. 3.

Referring back to FIG. 1 which is a block diagram schematically illustrating the steps of carrying out the method of the invention, the latter essentially comprises a step 1 of measuring reflection intensity spectrum, a step 2 of determining extreme value of wavelength, a step 3 of preparing an expected value table relative to the orders, a step 4 of calculating a group of expected values of film thickness, a step 5 of calculating deviated values, a step 6 of determining preference of a certain deviated value, a step 7 of determining the orders and a step 8 of determining film thickness.

Figure 1:
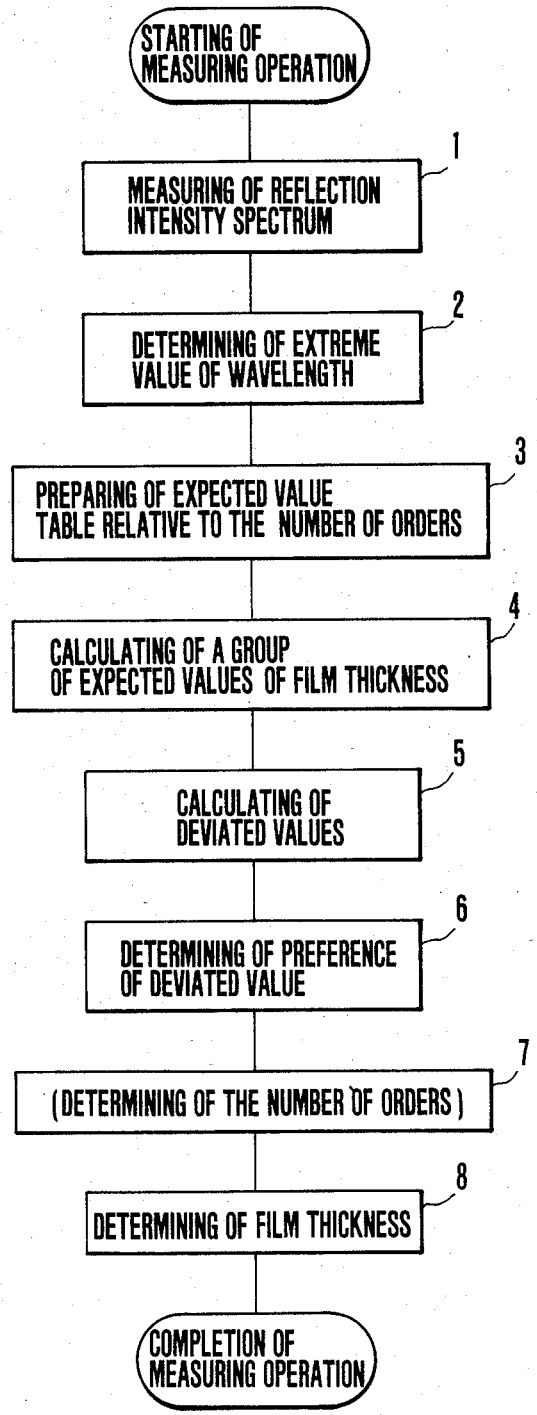
FIG. 1 is a block diagram illustrating a series of steps by way of which the method of the invention is carried out.

Specifically, the first step 1 of measuring reflection intensity spectrum as illustrated in FIG. 1 is constituted by measuring output relative to the distribution of reflection intensity. Next, as the second step, extreme values of wavelength, for instance, $\lambda_3$, $\lambda_2$ and $\lambda_1$ are determined with reference to the output distribution graph as illustrated in FIG. 3 whereby the second step is accomplished satisfactorily.

Next, during the third step an expected value table relative to the orders m is prepared. When such a spectrum as illustrated in FIG. 3 is obtained, there are a variety of possibilities of determining the orders as shown on Table 1.

TABLE 1

| case | number of orders | | |
|------|-------|-------|-------|
|      | $m_3$ | $m_2$ | $m_1$ |
| I    | 2.0   | 1.5   | 1.0   |
| II   | 3.0   | 2.5   | 2.0   |
| III  | 4.0   | 3.5   | 3.0   |
| IV   | 5.0   | 4.5   | 4.0   |
| V    | 6.0   | 5.5   | 5.0   |
| VI   | 7.0   | 6.5   | 6.0   |

As is apparent from Table 1 including the orders $m_1$, $m_2$, and $m_3$, each order corresponding to the maximum and minimum ones located in continuation in the illustrated spectrum has a difference of $\frac{1}{2}$ (0.5) between the adjacent ones.

Next, in the fourth step a group of expected values relative to film thickness d can be calculated as shown on Table 2 by utilizing a formula $d=(m/2n)\lambda$.

TABLE 2

| case | film thickness (Å) | | |
|------|-------|-------|-------|
|      | $d_3$ | $d_2$ | $d_1$ |
| I    | 3103  | 2741  | 2276  |
| II   | 4655  | 4569  | 4552  |
| III  | 6207  | 6397  | 6828  |
| IV   | 7759  | 8224  | 9103  |
| V    | 9310  | 10052 | 11379 |
| VI   | 10862 | 11879 | 13655 |

For instance, in the case where $SiO_2$ is used for the base plate 32 it is assumed that $\lambda_1=6,600$ Å, $\lambda_2=5,300$ Å, $\lambda_3=4,500$ Å and $n=1.45$. It should be added that when it is assumed that $m_1=1$ and $\lambda_1=6,600$ Å, $d_1$ in Table 2 is represented by $d_1=1\times 6,600/2\times 1.45=2276$ Å and when it is assumed that $m_2=1.5$ and $\lambda_2=5,300$ Å, $d_2$ is represented in the same manner by $d_2=1.5\times 5300/2\times 1.45=2741$ Å. Things are same with $d_3$ and the result of $d_3$ of 3103 Å is obtained in the same way.

Obviously, the value of d is obtained in the same way with respect to each of the cases (Cases I to VI).

In the fifth step deviated values are calculated for the reasons as mentioned below. Namely, when the film layer has a film thickness of d, a combination of wavelength $(\lambda_1, \lambda_2, \lambda_3)$ of extreme values (peak and dip) as seen on the spectrum in FIG. 3 and the corresponding number of orders is represented by a formula $m\lambda = 2nd$ and m is related to $\lambda$ in the one-to-one relation. Since m and $\lambda$ are plotted on a certain parabolic curve, it results that deviated values existent among calculated film thicknesses in the same case become larger than those of a group of film thicknesses calculated with the orders which are determined properly, when calculation of film thickness is achieved with the orders which are incorrectly determined relative to each wavelength. However, a combination of the orders m which are determined most correctly can be obtained by stepwise cancelling a combination of the orders m (in Case I to IV) which have high deviated values existent among $d_1$, $d_2$ and $d_3$.

In view of the above-mentioned fact the inventor calculated a value of $\delta_n$ as shown on Table 3 with respect to each of Cases in accordance with the following formula.

$$\delta_n \text{ (deviated value)} = \frac{d_1 - d_3}{d_1 + d_3} \times 100$$

where n = I, II, III and so forth.

TABLE 3

| | |
|---|---|
| $\delta_I =$ | $-15.4$ |
| $\delta_{II} =$ | $-1.1$ |
| $\delta_{III} =$ | 4.7 |
| $\delta_{IV} =$ | 7.9 |
| $\delta_V =$ | 10.0 |
| $\delta_{VI} =$ | 11.4 |

It should be noted that the case where $|\delta|$ becomes minimal under the condition of $\delta \leq 0$ is important. In this case value of n is represented by k.

Next, a formula 10 to the $(|\delta_k|/(|\delta_k| + |\delta_{k+1}|))$ power is provided. For clarity, the value determined by this formula will be referred to hereinafter as P. When $P > 5$, it is determined that the order $m_1$ corresponding to $\delta_{k+1}$ is $k+1$ (where k is natural numeral). Subsequently, $m_2$ and $m_3$ are determined (where $m_1 = k+1$, $m_2 = k+1.5$ and $m_3 = k+2$).

On the contrary, when $p < 5$, $m_1$ corresponding to $\delta_n$ is determined k (where k is natural numeral) and $m_2$ and $m_3$ are then determined (where $m_1 = k$, $m_2 = k+0.5$ and $m_3 = k+1$). Now, a true film thickness d can be determined selectively from a group of expected values $d_1$, $d_2$, and $d_3$ as shown on Table 2 with reference to the thus determined orders $m_1$, $m_2$, and $m_3$. It should be noted that when $P = 5$, the order $m_1$ fails to be obtained and therefore there is necessity for repeating measurement from the first step 1 of measuring reflection intensity spectrum.

In this case, to carry out the step 6 of determining preferance of a certain deviated value, $\delta_n$ is practically obtained.

To obtain, for instance, $\delta_I$, the values of $d_1$, $d_2$ and $d_3$ are extracted from Table 2. Now, $\delta_I$ is obtained in the following manner.

$$\delta_I = \frac{2276 - 3103}{2276 + 3103} \times 100 \, (\%) = -15.4$$

(As shown on Table 3,) $\delta_n$ is obtained with respect to each of cases in the above-described manner.

Figure 4:
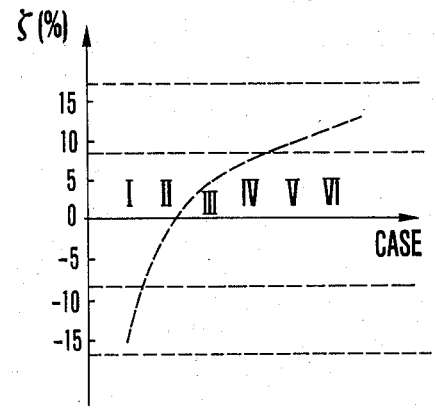
FIG. 4 is a graph illustrating deviated values relative to the interference orders.

Incidentally, in FIG. 4 the abscissa represents case value and the ordinate does deviated value $\delta$.

As is readily apparent from Table 3, deviated value existent among $d_1$, $d_2$ and $d_3$ becomes larger, when film thickness d is obtained in combination of extreme value of wavelength $\lambda$ with the orders m which do not correctly correspond to spectrum. To obviate the problem, the following value is obtained by using $\delta_{II}$ and $\delta_{III}$.

$$|\delta_{II}|/(|\delta_{II}| + |\delta_{III}|) = 0.190$$

As a result, P = 10 to the (0.190) power = 1.54 < 5 is established and thereby the orders corresponding to $\delta_{II}$ can be determined in such a manner that $m_1 = 2$. $m_2 = 2.5$ and $m_3 = 3$. This is the step 7 of determining the orders.

Finally, a correct film thickness d can be determined with reference to wavelength $\lambda$ and the orders m which have been correctly determined in that way in the step 7. This is the final step 8 of determining film thickness.

As will be readily understood from the above description, the method of the invention makes it possible to measure film thickness of the film layer on a certain material with high accuracy by determing the interference orders quickly and then calculating the film thickness with reference to the thus determined orders. Since film thickness of various film layer on the base plate such as silicon wafer or the like can be measured very accurately, the method of the invention remarkably contributes to improvement of quality control for semiconductor products in the industries concerned.

What is claimed is:

1. A method of measuring film thickness of the film layer on a certain material of which film thickness is to be measured by utilizing reflection interference, comprising the steps of:

measuring a reflection intensity spectrum,
    determining extreme values of wavelength for said reflection intensity spectrum,
    preparing an expected value table of the reflection interference orders associated with said extreme values of wavelength,
    calculating a group of expected values of film thickness with reference to said expected value table,
    calculating deviated values among the values of film thickness in association with the group of expected values,
    determining the expected orders which minimize absolute values corresponding to said deviated values so as to determine true interference orders; and
    determining a required film thickness with reference to the thus determined interference orders.

2. A method as defined in claim 1, wherein said method is carried out by operating an apparatus which comprises a light source adapted to emit a light beam toward material of which film thickness is to be measured, a monochromator, a semi-transparent mirror through which a light beam transmitted from said light source passes freely, a reflection mirror, an observation mirror, an objective lens, a photomultiplier tube adapted to receive a reflected light beam via said objective lens, said observation mirror, said reflection mirror and said semi-transparent mirror so as to generate photoelectric current, an amplifier and an oscilloscope or a CRT.

3. A method as defined in claim 2, wherein the monochromator is equipped with a diffraction grating which serves to generate marker signals having a predetermined step wavelength whereby wavlength of monochromatic light can be scanned.

4. A method as defined in claim 2, wherein the oscilloscope or CRT is operatively coupled to said monochromator so that it displays wavelengths scanned by said monochromator and the intensity of the reflected light beam transmitted from the material being measured.

* * * * *